United States Patent [19]

Deprez

[11] 4,204,786
[45] May 27, 1980

[54] ENDLESS CHAIN APPARATUS FOR FORMING SPUR AND HELICAL GEARS WITH MEANS FOR CONTROLLING CHAIN

[75] Inventor: Thomas A. Deprez, Rochester, N.Y.

[73] Assignee: The Gleason Works, Rochester, N.Y.

[21] Appl. No.: 930,779

[22] Filed: Aug. 2, 1978

[51] Int. Cl.² .............................................. B23D 37/18
[52] U.S. Cl. ........................................ 409/262; 409/59;
 51/136; 198/838
[58] Field of Search .................... 90/10, 9, 3, 78, 22, 90/82, 95; 51/136; 74/242.8; 198/813, 838

[56] References Cited

U.S. PATENT DOCUMENTS

| | | | |
|---|---|---|---|
| 1,409,766 | 3/1922 | Perkins et al. | 409/59 |
| 1,468,393 | 9/1923 | Perkins et al. | 409/61 |
| 1,469,602 | 10/1923 | Perkins et al. | 409/10 |
| 1,503,996 | 8/1924 | Perkins et al. | 409/38 |
| 1,712,256 | 5/1925 | Colman | 409/6 |
| 1,737,217 | 11/1928 | Colman | 409/41 |
| 2,080,464 | 5/1937 | Doan | 90/78 |
| 2,475,690 | 7/1949 | Bonnaffe | 409/10 |
| 2,692,537 | 10/1954 | Gleason et al. | 409/10 |
| 2,749,804 | 6/1956 | Daout | 409/10 |
| 2,838,980 | 6/1958 | Babcock | 90/78 X |
| 2,905,007 | 9/1959 | Carlsen | 409/166 |
| 3,587,385 | 6/1971 | Orend | 409/232 |

FOREIGN PATENT DOCUMENTS

| | | |
|---|---|---|
| 345611 | 6/1918 | Fed. Rep. of Germany. |
| 2413023 | 9/1976 | Fed. Rep. of Germany. |
| 380404 | 7/1973 | U.S.S.R. ........................... 90/78 |

Primary Examiner—Gil Weidenfeld
Attorney, Agent, or Firm—Morton A. Polster; Ralph E. Harper

[57] ABSTRACT

A gear cutting machine is provided with an endless chain for carrying a plurality of tools into contact with one or more workpieces to thereby form gear tooth configurations on the workpieces. The endless chain is pressed into firm contact with a first series of rollers in the zone in which its tools make contact with a workpiece to thereby prevent unwanted deflections of the endless chain and its tools relative to the workpiece. A second series of rollers prevents side-to-side deflections of the endless chain in the work zone.

3 Claims, 3 Drawing Figures

ENDLESS CHAIN APPARATUS FOR FORMING SPUR AND HELICAL GEARS WITH MEANS FOR CONTROLLING CHAIN

BACKGROUND AND BRIEF DESCRIPTION OF INVENTION

It is known in the art of broaching to provide for machines which utilize an endless chain for carrying a series of tools into contact with one or more workpieces. Additionally, it is known to utilize machines of this type for producing spur and helical gears. Examples of early machine designs for producing gears with tools carried on articulated links making up an endless chain are disclosed in U.S. Pat. Nos. 1,468,393; 1,469,602; 2,475,690; 2,692,537; and 2,749,804.

Machines utilizing an endless chain for carrying a plurality of tools offer a potential for very high speed production of whatever shape of workpiece is being formed by the tools. In fact, in the case of gear production, it is contemplated that stacks of gear blanks may be worked simultaneously with machinery of this type, rather than one at a time as has been the case with many other types of gear forming machines. However, the requirements for gear manufacture are far more severe than those for other forms of broaching, and therefore, machines of this type have not been, as far as is known, commercially acceptable for high production gear manufacturing needs. The forming of gear tooth profiles on a work blank requires precise control of an engagement between a workpiece and each cutting tool, and this requirement demands, in turn, a very rigid machine which maintains precise placement of workpiece and tool under a working load and for a sustained operation of the machine. Since an endless chain is by its very nature not as rigid as other forms of tool-holding equipment, it has been a problem in this art to design and manufacture an endless chain type of machine having the capability of high production manufacture of precision gears.

In contrast to a prior art suggestion of backing an endless chain with a drive gear at its zone of contact with a workpiece, the present machine includes a pair of spaced apart driven members in positions which are upstream and downstream from the zone of contact of the endless chain with the workpiece. The driven members are designed so that they can be adjusted and fixed relative to each other in a way which tends to "stretch" and remove backlash from articulated links of the portion of the chain being driven by and between the spaced driven members. This action effectively tightens the chain between the two driven members to thereby remove any looseness in its links and points of articulation and to make it more rigid. The tightened chain is less likely to chatter or deflect in the cutting zone, and this permits a better control of tooth profile in the manufacture of precision gears. The spacing of the driven members is sufficient to include several articulated links of the endless chain so that an entire section of chain, for its entire width, can be made effectively rigid to accommodate a stack of gears in the cutting zone and to provide a rigid face across which one or more gears can be translated during a cutting operation. Thus, this arrangement has an effect of making a relatively large portion of an endless chain sufficiently rigid to permit precision production of multiple numbers of workpieces or to accommodate greater relative movement between even a single workpiece and the cutting tools of such a machine, than has been attained in the past. Details of this arrangement are also described and claimed in my copending application Ser. No. 930,252, filed even date herewith under title of "ENDLESS CHAIN APPARATUS FOR FORMING SPUR AND HELICAL GEARS".

Since the spaced driven members which are used for tightening the endless chain do not function, in the same sense as certain prior art arrangements, to support the endless chain in its cutting zone, a first series of rollers is provided in the cutting zone for firmly backing the endless chain as it engages one or more workpieces. In addition, a second series of rollers is provided to control side-to-side movements of the endless chain. Although various forms of guideways have been provided for endless chains in the prior art (see, for examples the guides shown in FIGS. 13 and 14 of U.S. Pat. No. 1,469,602), it is believed that the use of two series of rollers for fully supporting and confining separate links of an endless chain as they pass through a work zone constitutes an improvement in this art. These rollers and their specific functions will be described herein in combination with the tightening means described above.

These and other features and advantages of the present invention will be discussed in further detail below. In that discussion reference will be made to the accompanying drawings as briefly described below.

DETAILED DESCRIPTION OF INVENTION

Figure 1:
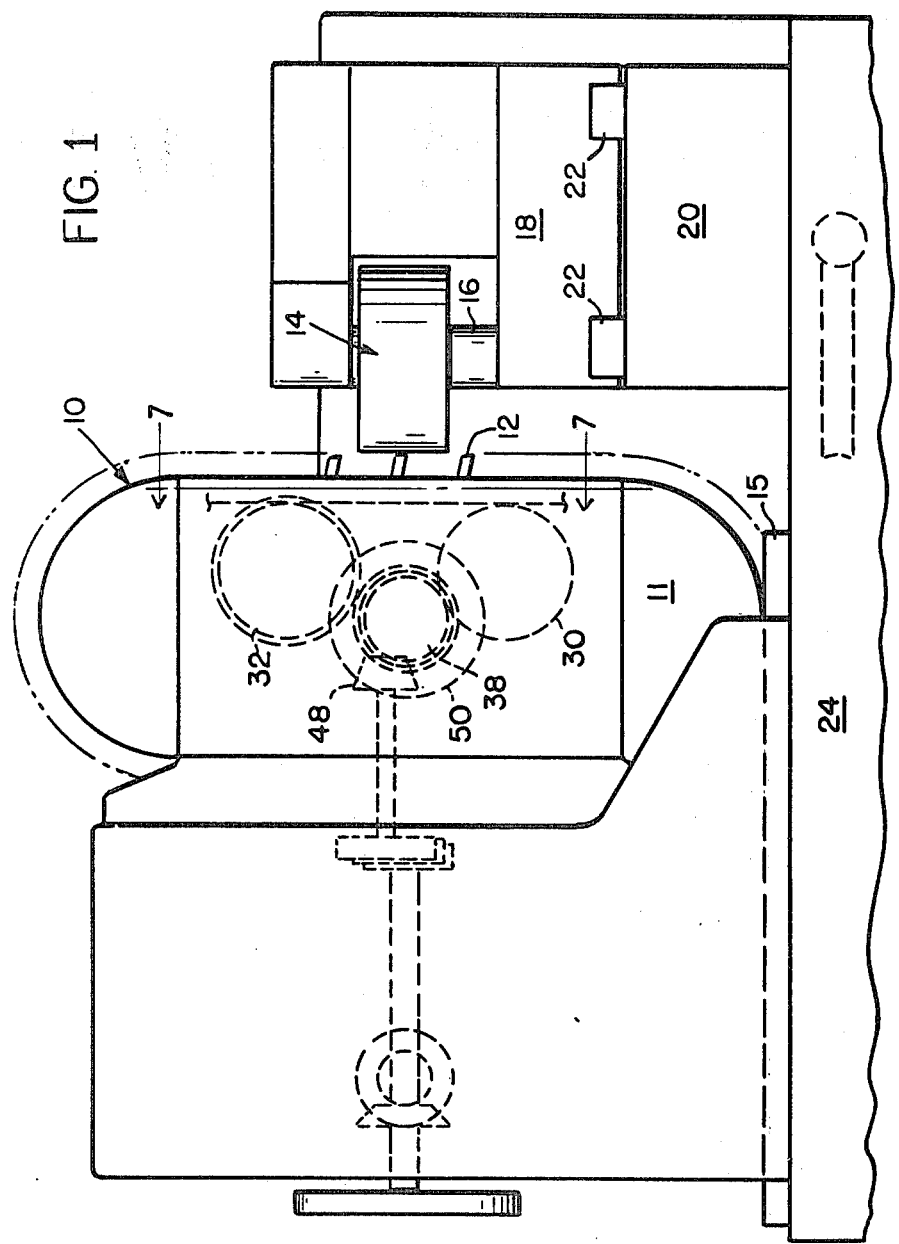
FIG. 1 is an elevational view of a machine of the general type contemplated by the present invention.
Figure 2:
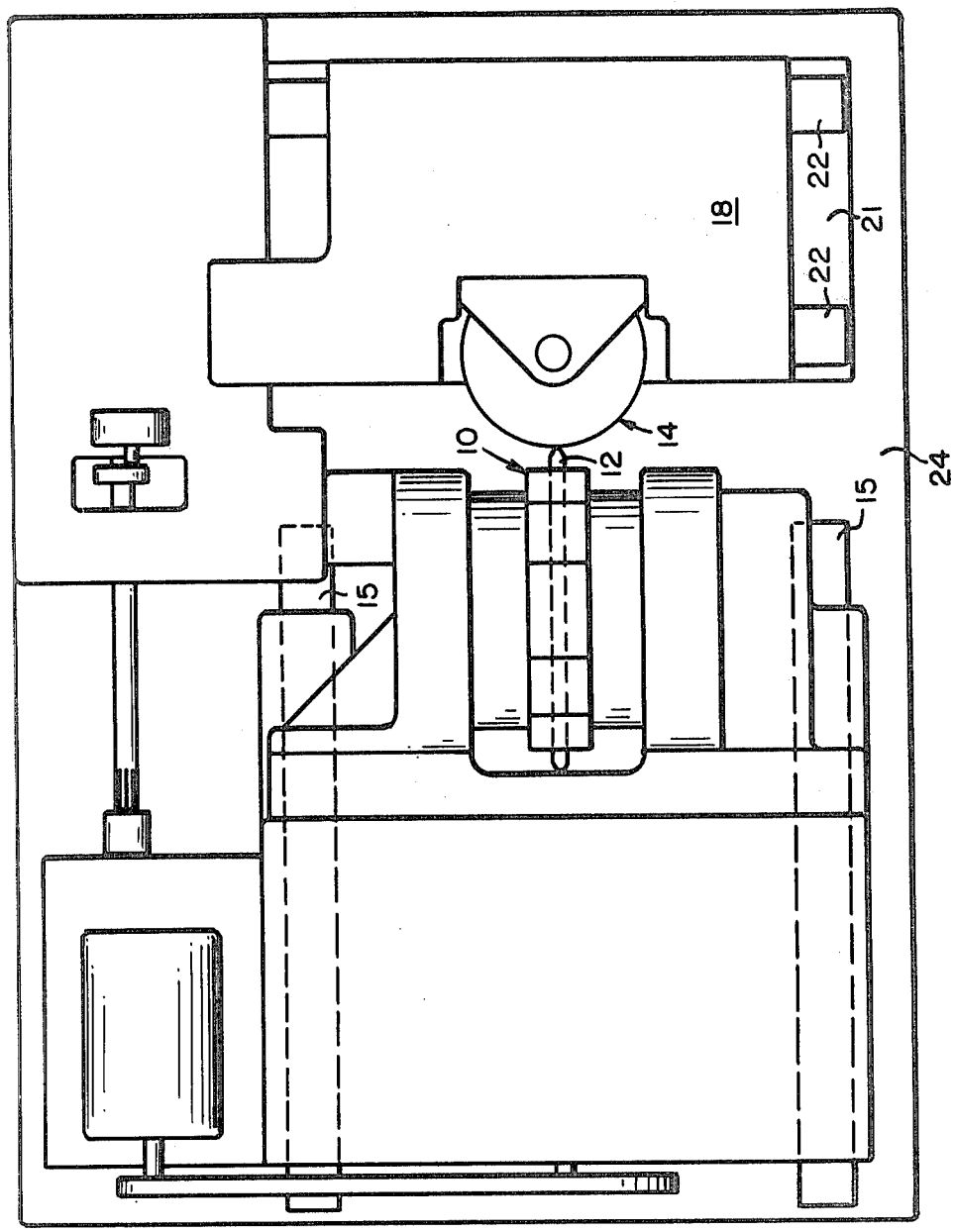
FIG. 2 is a top plan view of the machine shown in FIG. 1.

FIGS. 1 and 2 illustrates the type of gear manufacturing machine contemplated by the present invention in which an endless chain 10 is made up of a series of articulated links for carrying stock removing tools 12. The stock removing tools 12 may be in the form of cutting or grinding tools and may be arranged in one or more rows around the entire circumference of the endless chain 10. FIG. 1 shows the endless chain mounted in a vertical orientation around a housing 11 for being advanced toward and away from one or more workpieces 14 (workpieces may be manufactured one at a time or may be stacked and manufactured in multiple numbers) on ways 15, but other orientations of the endless chain are possible. At the work station end of the machine, the workpieces 14 are removably mounted on a spindle 16 mounted in a housing 18. The housing 18 is carried on a base 20 and may be mounted on ways 22 for providing a relative translating motion between the workpiece 14 and the endless chain 10. All working components are carried on a common base 24 which includes the base 20. Details of the machine itself may vary widely in accordance with known design features for such machines. For example, loading and unloading devices may be provided for moving workpieces into and out of the work station area, and it would be possible to provide for translation of the endless chain itself relative to a fixed position of the workpieces, if desired. In addition, known means are provided for tilting the housing 11 and its endless chain 10 for setting a helix angle for the manufacture of helical gears.

Figure 3:
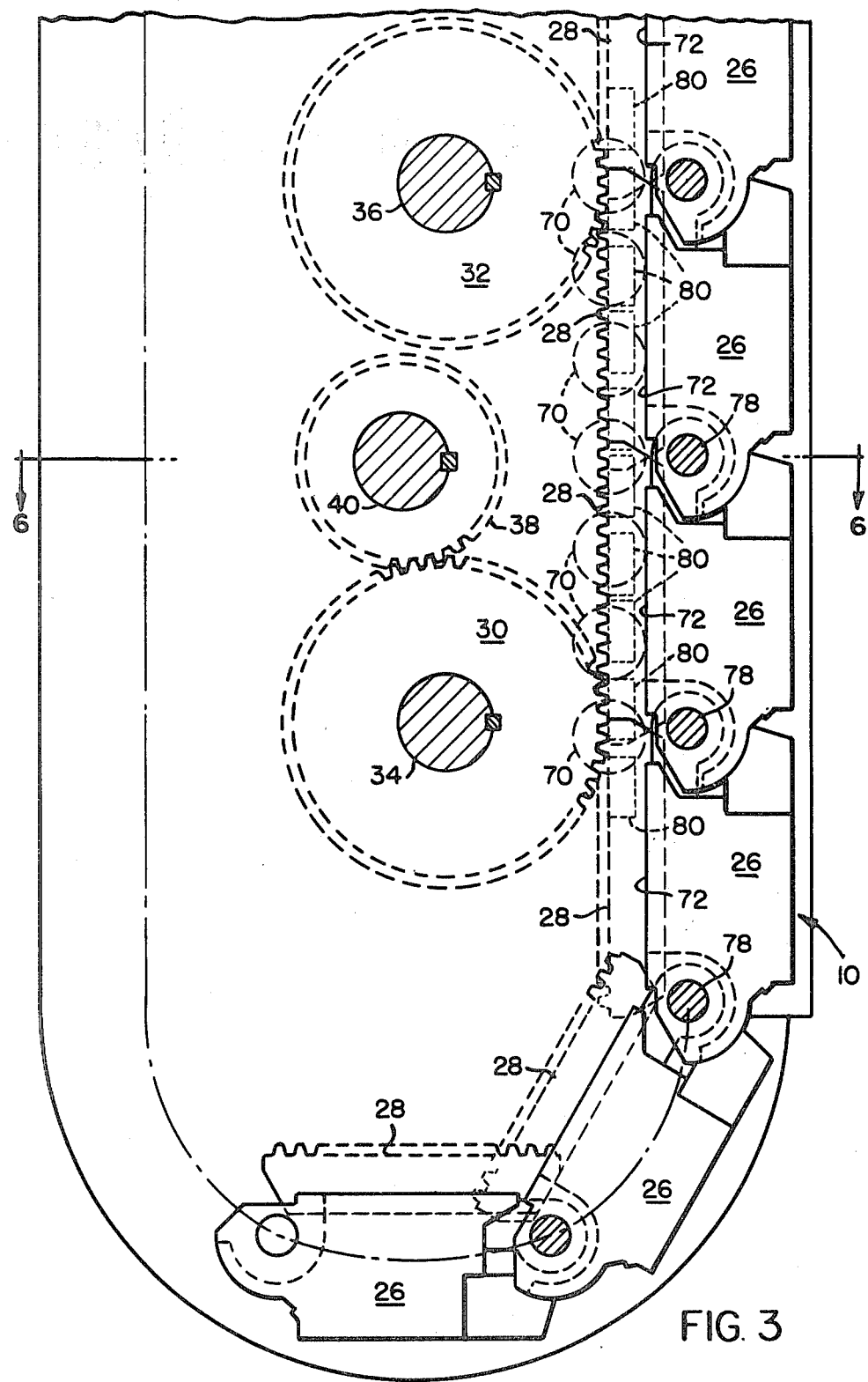
FIG. 3 is an enlarged view of a portion of an endless chain associated with the machine of the present invention, showing means for driving and tightening the chain.

FIG. 3 is an enlarged elevational view of portions of the endless chain 10. The endless chain 10 is made up of a series of articulated links 26 (a number of which have been omitted from the FIG. 3 view but which would include a sufficient number to form a complete endless chain made up of such links), and it can be seen that the links 26 are arranged to be driven in a straight path in the zone in which tools carried by the links engage one or more workpieces carried by a workpiece support of the machine. The work zone may be considered to be the straight path portion shown to the right side of the FIG. 3 view. Cutting tools have been omitted from this drawing for purposes of clarity.

It can be seen that each link member 26 includes an inner rack portion 28 secured to the main body of the link for meshing engagement with a pair of spaced apart driven members 30 and 32. The driven members 30 and 32 comprise gears having equal diameters and numbers of teeth for engaging the tooth profiles on the racks 28 of each articulated link. Thus it can be seen that the gear 30 is mounted in a driving contact with the endless chain, and the gear 32 is mounted in the spaced position therefrom to define a flat plane in the cutting direction of movement of the endless chain. As will be discussed in greater detail below, one of the gears 30 or 32 is arranged to be rotated and fixed relative to the position of the other of the gears to thereby effectively stretch and tighten the endless chain 10 in the flat plane defined between the positions of the two gears 30 and 32.

Figure 4:
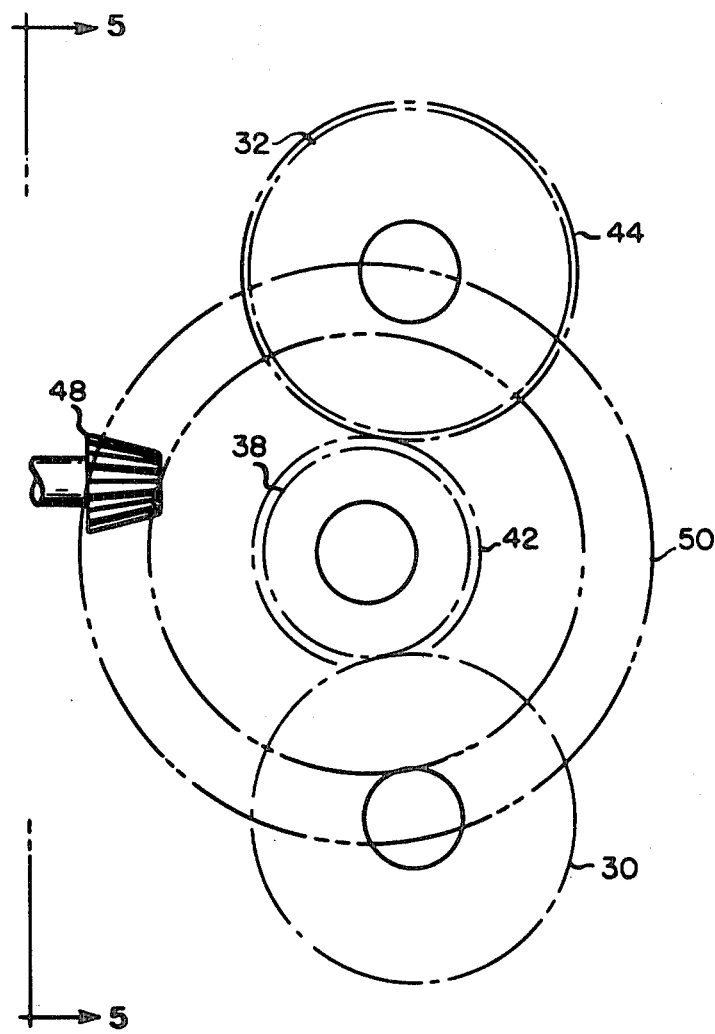
FIG. 4 is a view of a gear train for driving and tightening the endless chain, as seen in the same orientation as that of FIG. 3.
Figure 5:
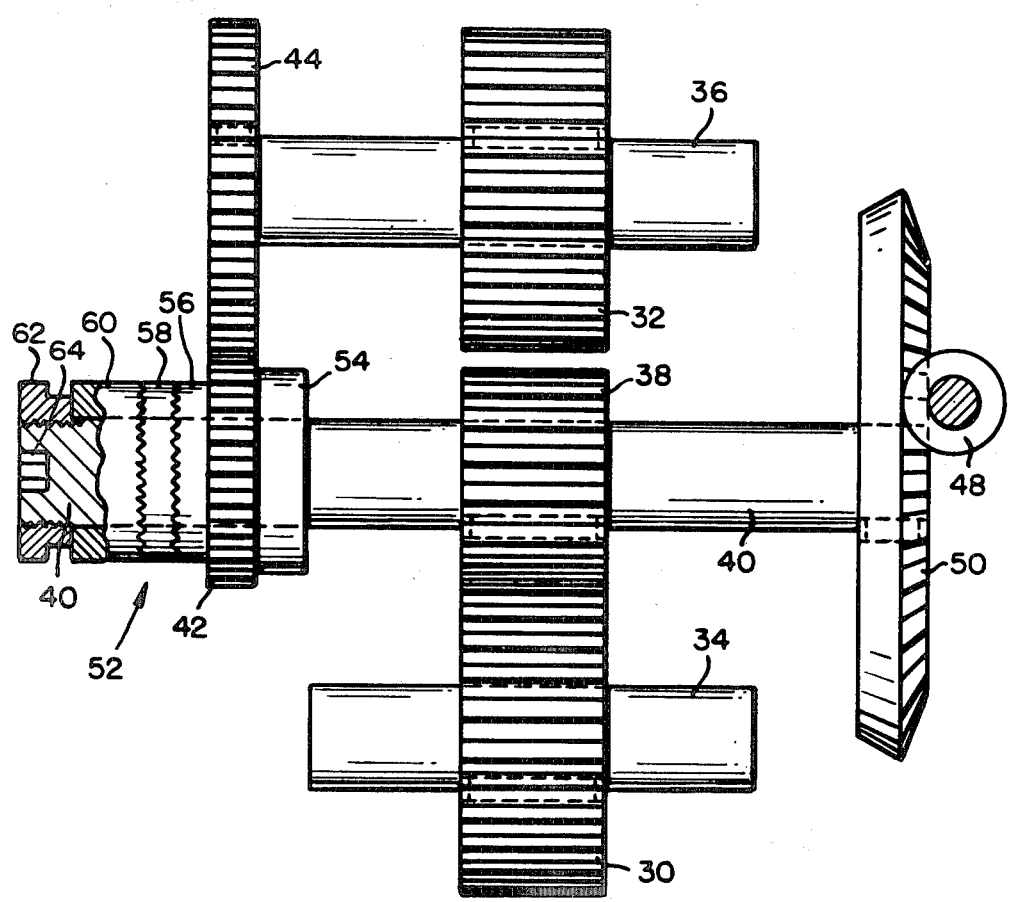
FIG. 5 is a view of the FIG. 4 gear train, as seen on line 5—5 thereof.

Referring also to FIGS. 4 and 5, it can be seen that each of the gears 30 and 32 is mounted and fixed to its own separate shaft (shafts 34 and 36, respectfully) while a third gear 38 is mounted and fixed on a main drive shaft 40 for driving the gear 30. The gears 30 and 32 are arranged so that the third gear 38 meshed with and drives only the gear 30. A fourth gear 42 is releasably secured to an end of the main drive shaft 40 and is in meshing engagement with a fifth gear 44 fixed to an end of the shaft 36. Thus, rotation of the drive shaft 40 results in a corresponding rotation of the gear 42 which, in turn, permits counter-rotation of the shaft 36 and its gear 32 through the meshing engagement of gear 42 with gear 44. In this way, driving rotations can be transmitted from a pinion 48 and ring gear 50 to the common drive shaft 40 and to the gear 30 and the endless chain 10 so as to produce a synchronized rotation of the pair of gears 30 and 32 in their meshing engagement with the endless chain 10.

FIG. 5 illustrates a coupling assembly 52 which is used for locking and unlocking the fourth gear 42 and for providing adjustment between the pair of gears 30 and 32. The coupling assembly includes a shoulder 54 fixed to the main drive shaft 40 for clamping one side of the gear 42. The gear 42 is not keyed to the main drive shaft 40 and is free to rotate until it is clamped into a fixed position between the shoulder 54 and an opposing face clutch member 56. Face clutch member 56 is secured to or formed integrally with the gear 42. An intermediate face clutch member 58 rides freely on the shaft 40, and a final face clutch member 60 is keyed or otherwise secured to an extension of the drive shaft 40. The clutch members 56, 58, and 60 are clamped and unclamped relative to each other and to the gear 42 through a threaded clamping ring 62. When it is desired to adjust relative positions of the pair of gears 30 and 32, the clamping ring 62 is unscrewed from its clamping position on the end of the main drive shaft 40, and this releases the clutch elements 56, 58, and 60 from tight engagement. Then, a tool can be inserted into the recessed opening 64, and the drive shaft 40 can be rotated by a precise increment to cause gear 30 to rotate in a direction which tightens and stretches the chain links contained between the gear 30 and the gear 32. During this procedure, the gear 42 is held in a fixed position. Once the adjustmemt has been made, the clutch elements 56, 58 and 60 are reclamped against the gear 42 through a tightening of the threaded ring 62 to lock the gear 42 in an adjusted position relative to the main drive shaft 40. Then the gear 42 is released from its secured position, and the chain is set in a tightened condition for being driven by the pinion 48 and gear 50.

Figure 6:
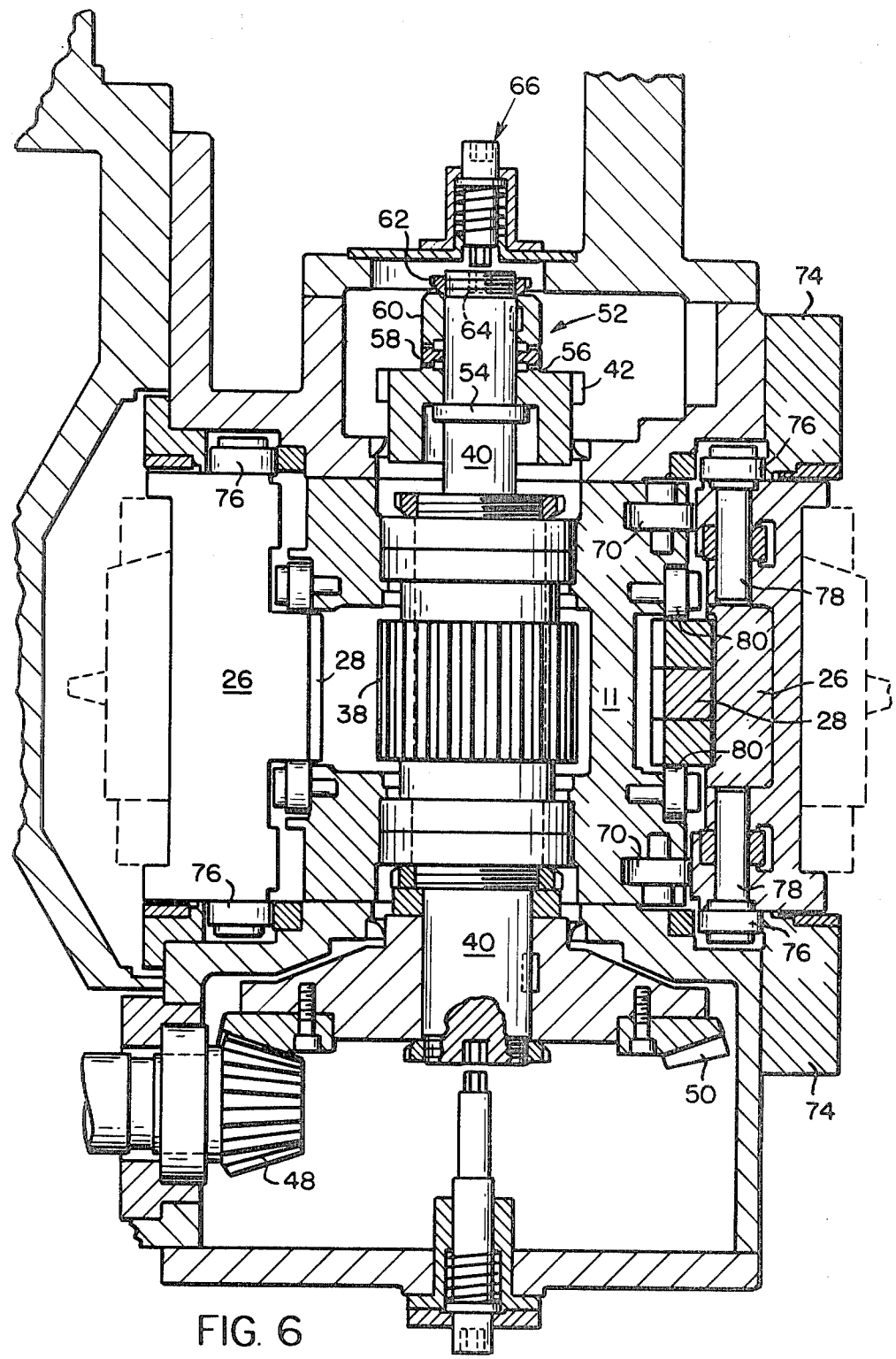
FIG. 6 is a cross sectional view of a portion of the chain and drive means shown in FIG. 3, as seen on line 6—6 of FIG. 3.

FIG. 6 shows a less schematic illustration than that of FIG. 5 of the coupling assembly 52. In this arrangement, the element 56 has been incorporated into a shoulder portion of the gear 42 and is, therefore, not shown as a separate element. Also, it can be seen that a special provision has been made for reaching the recessed opening 64 from outside of the confines of the machine housing through a spring loaded driving device 66 which can be pushed into engagement with the recessed opening 64 for effecting a rotation of the entire endless chain.

Figure 7:
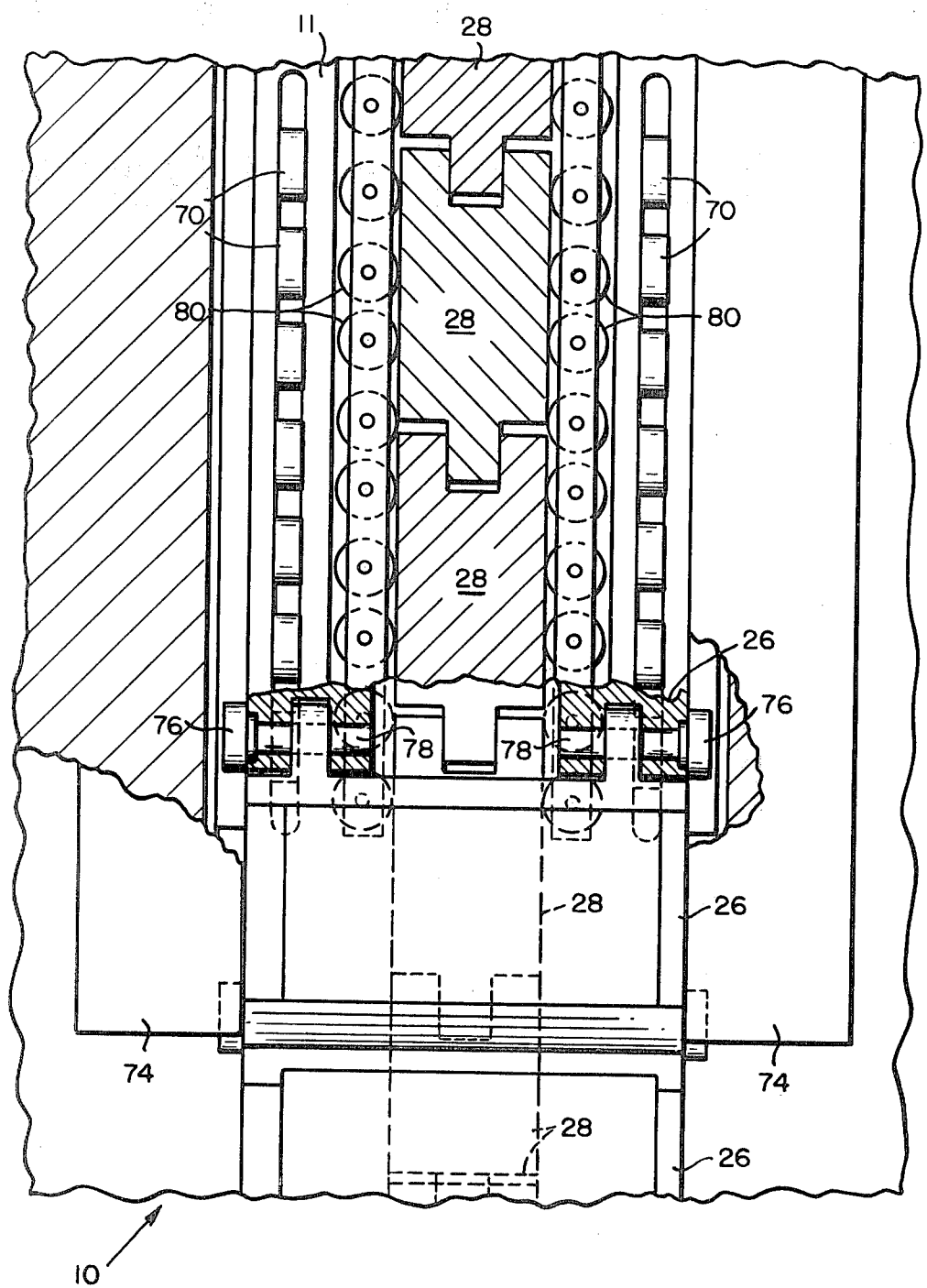
FIG. 7 is a front elevational view of a portion of the working face of the machine, showing two series of rollers carried by a housing for the endless chain means, as seen from line 7—7 of FIG. 1.

FIG. 6 also illustrates details of an actual embodiment of an endless chain provided with the driving features of the present invention. Since the pair of gears 30 and 32 do not provide support for the endless chain in the actual cutting zone of the chain, a first series of rollers 70 (see also FIG. 7) are positioned within a portion of the housing 11 for firmly backing the endless chain 10 in the cutting zone region. As shown in FIG. 3, bearing surfaces 72 are provided on the back sides of the individual links 26 for riding on the series of rollers 70. The individual links 26 are pressed into firm contact with the rollers 70 through the use of gibs 74 (FIG. 6) which are fastened along each side of the chain path so as to engage and press down on rollers 76 which serve to connect separate links 26 together. The rollers 76 also function to ride in guideways formed in the housing 11 after they leave the working zone areas where the links 26 are released from the support of the backing rollers 70.

A second series of rollers 80 are positioned in the housing 11 on opposite sides of the rack portion 28 of the individual links making up the endless chain 10, and these rollers serve to confine the chain in the working zone area to prevent any unwanted side-to-side motions of the chain in the critical work area.

The first and second series of rollers (70 and 80, respectively) serve to firmly back up and confine the path of travel of the endless chain in the work area zone of the machine. Preferably, a sufficient number of rollers are provided to support three or more links 26 in the work zone area, and the rollers are arranged so that at least six of the rollers 70 (three on each side of the path of travel) support each single link 26 at any given time during the movement of the endless chain through the work zone.

Although the invention has been described and discussed with reference to a specific embodiment only, it can be appreciated that certain variations and equivalent structures can be substituted for those discussed above. All such equivalent designs are intended to be included within the scope of protection sought herein as described in the claims below.

What is claimed is:

1. In apparatus of the type which includes a tool-carrying endless chain assembled from a number of articulated links which each have a gear engaging rack portion depending longitudinally therefrom together with bearing surfaces adjacent to the depending rack portion, the improvement in means for controlling movement of the endless chain as it passes through a work zone in which its tools make contact with a workpiece, characterized by a housing defining a path of travel for the endless chain, with the path of travel having a straight section in the work zone portion of its travel, guide rollers carried on opposite sides of each link of said endless chain for guiding the chain in its path of travel about said housing, a first series of rollers positioned in parallel rows along said straight section of the work zone for supporting said bearing surfaces of the links of said endless chain as the endless chain travels through the work zone, gib means secured along both sides of said straight section of said housing for engaging said guide rollers as the chain links enter the work zone portion of the chain travel to thereby press the endless chain into firm contact with said first series of rollers as the endless chain moves through the work zone, and a second series of rollers positioned in parallel rows in the straight section of said housing for contacting and guiding opposite sides of the depending rack portions of said links of the endless chain to prevent unwanted side-to-side deflections of the endless chain as it moves through the work zone.

2. The improvement of claim 1 wherein said straight section in the path of travel of said endless chain is of a sufficient length to include at least three links in said work zone.

3. The improvement of claim 1 wherein the individual links of said endless chain are each supported by at least six rollers of said first series of rollers as the endless chain moves through said work zone.

* * * * *